(No Model.)
J. SCHWARTZ.
INFLATION VALVE AND COUPLING FOR PNEUMATIC TIRES.
No. 579,934. Patented Mar. 30, 1897.
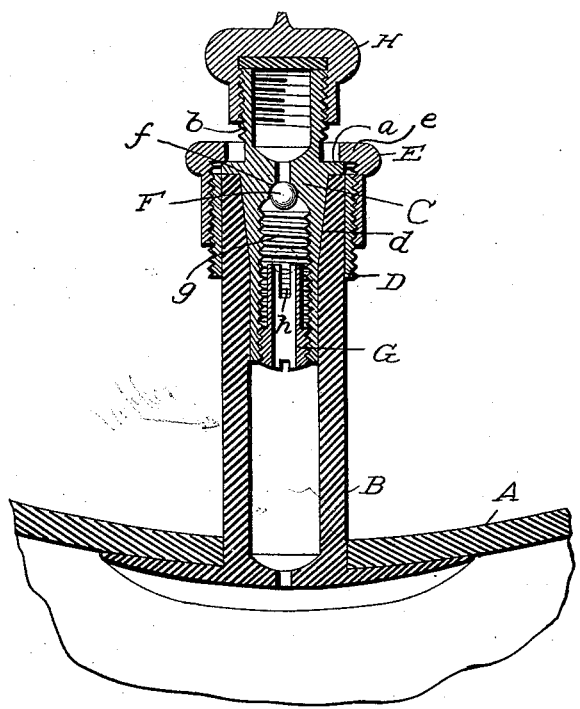
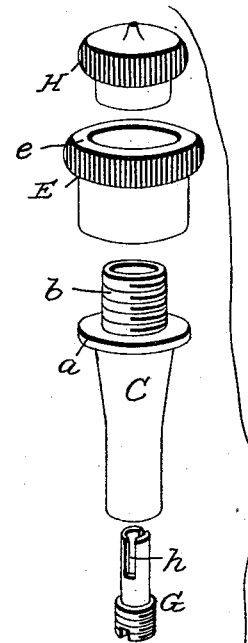
Witnesses:
Inventor
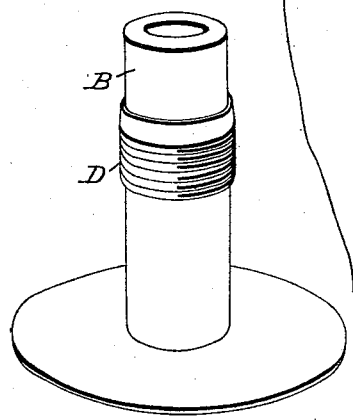
Attorney

UNITED STATES PATENT OFFICE.

JOSEF SCHWARTZ, OF BAY CITY, MICHIGAN.

INFLATION-VALVE AND COUPLING FOR PNEUMATIC TIRES.

SPECIFICATION forming part of Letters Patent No. 579,934, dated March 30, 1897.

Application filed January 2, 1897. Serial No. 617,805. (No model.)

*To all whom it may concern:*

Be it known that I, JOSEF SCHWARTZ, a citizen of the United States, residing at Bay City, in the county of Bay and State of Michigan, have invented certain new and useful Improvements in Inflation-Valves and Couplings for Pneumatic Tires; and I do declare the following to be a full, clear, and exact description of the invention, such as will enable others skilled in the art to which it appertains to make and use the same.

My invention relates to improvements in that class of check or non-return valves which are designed more especially for use upon pneumatic bicycle-tires and other inflatable devices; and it has for one of its objects to provide a valve of the class mentioned which is adapted to permit a free passage of air into a tire or other inflatable device and effectually check the outward passage of the same, and one which is very simple and durable and which is adapted to be readily taken apart for the purpose of repair and as readily put together again.

Another object of the invention is to provide a check or non-return valve and means whereby the same may be readily secured in the flexible inflation-tube of the tire in such a manner that while a casual removal or disconnection of the valve from the tube will be effectually prevented yet said valve may be readily disconnected and removed from the tube when desirable or necessary without injury to any of the parts and without disconnecting the inflation-tube from the tire or removing said tire from the wheel.

Other objects and advantages of the invention will be fully understood from the following description and claim when taken in conjunction with the annexed drawings, in which—

Figure 1 is a sectional view illustrating the valve secured in its operative position in the inflation-tube of a pneumatic tire, and Fig. 2 comprises separate perspective views of all the parts shown in Fig. 1 with the exception of the inflatable tire.

Referring by letter to the said drawings, A indicates a portion of a pneumatic bicycle-tire or other inflatable device, and B indicates the flexible inflation-tube thereof, which may be formed of rubber or rubber and canvas and may be connected to the tire in any suitable manner, although I prefer to connect it in the usual manner, as shown. In the outer end of this inflation-tube B is arranged the body C of my improved valve, which has the flange $a$ at an intermediate point of its length bearing against the outer end of the tube, and also has its portion $b$ above the flange exteriorly threaded, as shown, for a purpose presently pointed out. Below the flange $a$ the said valve-body is tapered for a portion of its length, as indicated by $d$, so as to enable it to fit tightly in the tube B and be securely fastened therein by the band D and the annular nut E. (Better shown in Fig. 1.)

The band D surrounds the inflation-tube B and is designed, after the valve-body is inserted in the tube, to be moved upward on the tube until it surrounds the taper portion $d$ of the valve-body, in which position it is secured by the nut E, which has the flange $e$ engaging the flange $a$ of the valve-body and also has the interior threads engaging the threads of the bands, as illustrated. In virtue of this construction it will be observed that the valve-body C may be quickly secured in the tube B, and also that the said tube is compressed between the ring D and the taper portion $d$ of the valve-body, which will effectually prevent a casual disconnection of the valve-body from the tube. It will further be observed that said valve-body may be readily disconnected from the tube B when desirable or necessary, it being simply necessary in order to accomplish this end to screw the nut E off the band D and move said band down upon the tube, when the valve-body may be readily lifted from said tube.

The valve-body C is tubular, and it is interiorly provided with the valve-seat $f$ and also with the interiorly-threaded portion $g$ between the valve-seat, which portion $g$ has its upper end concave, as shown, so as to assist the ball-valve F, which is preferably of metal, in regaining its seat after it has been pressed away from the same. In the said threaded portion $g$ of the body C and between the valve F is arranged the tubular screw G, which has its upper portion reduced in diameter and provided with openings $h$ for the passage of air when the valve is seated upon its upper end, and also has its lower end kerfed, as shown, for the engagement of a screw-driver, so that it may be readily removed and replaced when desired.

H indicates the usual dust-excluding cap, which is screwed upon the upper threaded end of the valve-body C.

In the practice of the invention it will be seen that when air is forced into the outer or upper end of the valve-body the ball-valve F will be forced down upon the upper end of the screw G and the air will be permitted to freely pass through the openings $h$ into the screw and from thence through the tube B into the tire or other device to be inflated. When, however, the air tends to leave the tire A, the ball-valve F will be immediately forced and tightly held against its seat $f$ and will effectually prevent the passage of the air from the tire.

When it is desired to repair the valve or replace any of its parts with new parts, the valve-body C and its appurtenances may be readily disconnected and removed from the tube B in the manner before described without the necessity of disconnecting the said tube from the tire A or removing the tire from the wheel-rim, which is an important advantage, as is obvious. When the valve-body C is removed from the tube B, access may be gained to the valve and the valve-seat by removing the screw G, and said valve and its seat may be conveniently cleaned or the valve may be replaced with a new one, if necessary.

From the foregoing it will be seen that notwithstanding its many advantages my improved valve is very cheap and simple and embodies but a minimum number of parts, none of which are liable to get out of order.

Having thus described my invention, what I claim is—

The combination of an inflatable device having a flexible inflation-tube connected thereto, the tubular valve-body having a tapered portion $d$, arranged in said tube and a flange bearing against the outer end of the tube and also having the valve-seat and an interiorly-threaded portion below said seat, a tubular screw accompanying the inner end of said valve-body and engaging the interior threads thereof and having the portion reduced in diameter and provided with openings $h$, and a ball-valve arranged in the valve-body in the space between the valve-seat and the contiguous end of the tubular screw, a threaded band arranged upon the inflation-tube and an annular nut bearing upon the flange of the valve-body and having threads engaging those of the band, substantially as and for the purpose set forth.

In testimony whereof I affix my signature in presence of two witnesses.

JOSEF SCHWARTZ.

Witnesses:
W. J. GROVE,
JACOB BECK, Jr.